Figure 1:
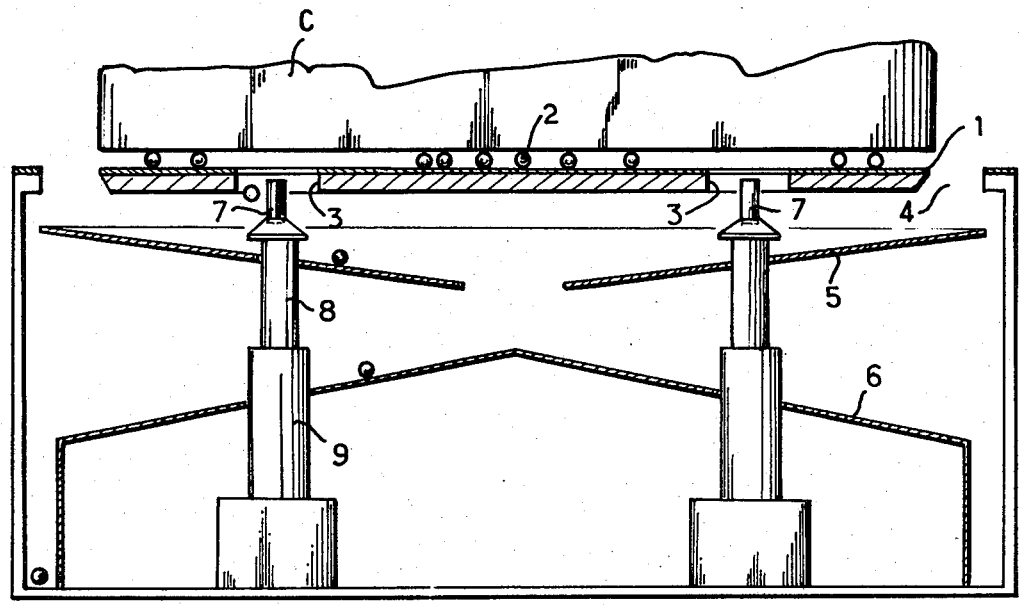

United States Patent [19]

Dussud

[11] 4,365,699
[45] Dec. 28, 1982

[54] APPARATUS FOR HANDLING MATERIALS BY MEANS OF A BALL BEARING-MOUNTED TABLE

[76] Inventor: Jean-Benoit Dussud, Meylan, France

[21] Appl. No.: 220,699

[22] Filed: Dec. 29, 1980

[30] Foreign Application Priority Data

Jan. 14, 1980 [FR] France .................... 80 00689

[51] Int. Cl.³ ............................................. B65G 13/00
[52] U.S. Cl. ............................ 193/35 SS; 193/35 MD
[58] Field of Search ........... 193/35 R, 35 SS, 35 MD; 198/345; 406/83; 308/6 R, 6 C, 3 R, 3 H

[56] References Cited

U.S. PATENT DOCUMENTS 2,789,708  4/1957  Payne ............................ 193/35 MD
4,303,279 12/1981  Dussud ......................... 193/35 MD

FOREIGN PATENT DOCUMENTS 1559673  2/1969  France ............................... 193/35 R
 292868  8/1953  Switzerland ................. 193/35 MD Primary Examiner—John J. Love
Assistant Examiner—Gene A. Church
Attorney, Agent, or Firm—Frishauf, Holtz, Goodman & Woodward

[57] ABSTRACT

Apparatus for handling materials using a ball bearing mounted table. It includes a table having a horizontal plate (1) on which ball bearings (2) of the same diameter roll freely, thus enabling a load (C) to be displaced. The load (C) can be immobilized by supports (7 and 8) passing into passage (3) drilled in plate (1).

4 Claims, 3 Drawing Figures

APPARATUS FOR HANDLING MATERIALS BY MEANS OF A BALL BEARING-MOUNTED TABLE

In French Pat. No. 7834102, an apparatus for handling or displacing loads or for causing them to pivot on themselves is described, comprising a table with a horizontal plate on which ball bearings of the same diameter roll freely. There is no preferential direction of movement. Friction is reduced to such an extent that heavy objects or objects with a soft base, which could not even be moved in a preferential direction using earlier ball bearing-mounted tables, can be made to change direction.

Frequently, it is desirable to perform some operation on the load which requires the load to be immobilised. The invention provides an improvement to the ball bearing-mounted table of the type mentioned hereinbefore, by allowing a load to be immobilised or displaced thereon, as desired.

The table according to the invention is characterised by three non-aligned passages, opening on to the plate, for three retractable supports, and by means for raising the tops of the supports above the ball bearings.

As the supports are raised, the load is lifted and immobilised.

To prevent the support from being blocked by a ball bearing falling into the passage, the distance between the walls of a passage and a support is greater, at every point, than the diameter of the ball bearings, irrespective of the location of the support in the passage.

Nevertheless, the openings of the passages on to the plate should preferably be as small as possible since these are the points where the ball bearings leave the table. For this reason, the support advantageously comprises the shaft of a jack, adapted to lift a heavy load, extended by a rod of smaller diameter or cross-section which thus provides a passage of small dimensions but having sufficient flexural strength owing to its reduced length.

Figure 3:
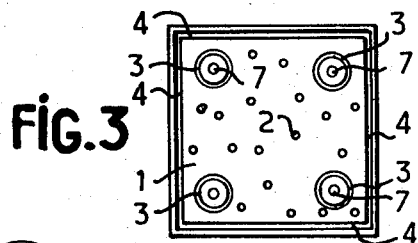
Figure 2:
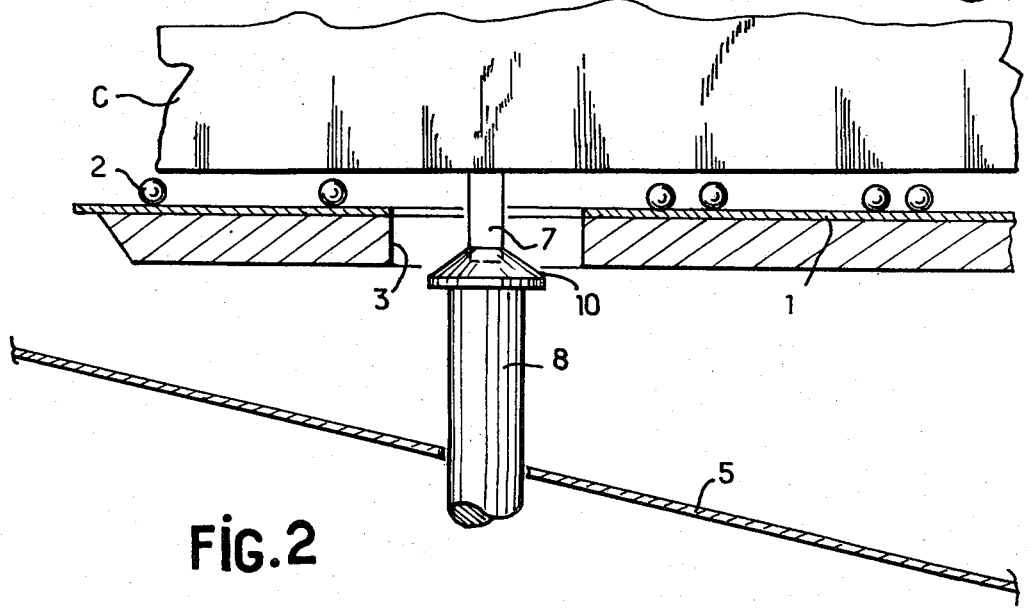

FIG. 1 is a sectional view of an apparatus according to the invention with the supports retracted underneath the table, whilst FIG. 2 is a partial view of the apparatus on a larger scale, with the supports lifting and holding a load, and FIG. 3 is a plan-view of the apparatus without any load on it.

The apparatus comprises a square table with a horizontal plate 1, on which ball bearings 2 of the same diameter roll freely supporting a load C, this horizontal plate 1 being drilled with four passages 3 at the four corners of an imaginary square.

Gullies 4, provided at the edges of the table, open on to a ball bearing distributor having ramps 5 and a cone 6.

A cylindrical terminal rod 7 fixed to the cylindrical shaft 8 of a jack 9 can move up into each passage 3.

The rod 7 has a much smaller diameter than the shaft 8 and is much shorter than the latter. The shoulder between the rod 7 and the shaft 8 is concealed by a cap 10 in the form of a truncated cone widening out downwardly.

Whatever the position of the rod 7, any distance between the support, consisting of the rod 7, shaft 8 and cap 10, and the passage 3 drilled in the plate 1 of the table, is greater than the diameter of the ball bearings 2.

In order to immobilise the load C, it is raised above the ball bearings 2 using the four supports. Owing to their diameter, the ball bearings can neither be blocked in the passages 3 nor immobilised on the ramps 5 and cone 6, since the cylindrical shaft 8 and jack 9 are in contact with the ramps 5 and cone 6 along convex lines.

What is claimed is:

1. Apparatus for handling a load comprising a table with a horizontal plate and three nonaligned passages having walls below the plate and opening onto the plate, a plurality of ball bearings of the same diameter which roll freely on the plate and on which a load may be displaced, three retractable supports with tops and means for raising the supports through the respective passages until their tops attain a higher level than the tops of the ball bearings, so that the load becomes disengaged from the ball bearings, the distance, at any point, between the walls of a passage and the corresponding support being always greater than the diameter of the ball bearings so that the ball bearings may still fall through the passages when the supports are raised.

2. Apparatus according to claim 1 wherein each support terminates in a rod having a smaller cross-section and shorter length than the shaft of a jack to which said rod is fixed.

3. Apparatus according to claim 1 wherein each support is conical, widening out downwardly.

4. Apparatus according to claim 1, comprising a ball bearing distributor underneath the table, wherein each support passes through the distributor and the zones of contact of the supports with the distributor are convex.

* * * * *